No. 643,504. Patented Feb. 13, 1900.
H. HUGHES.
CAR COUPLING FOR MINES.
(Application filed Apr. 5, 1899.)
(No Model.)
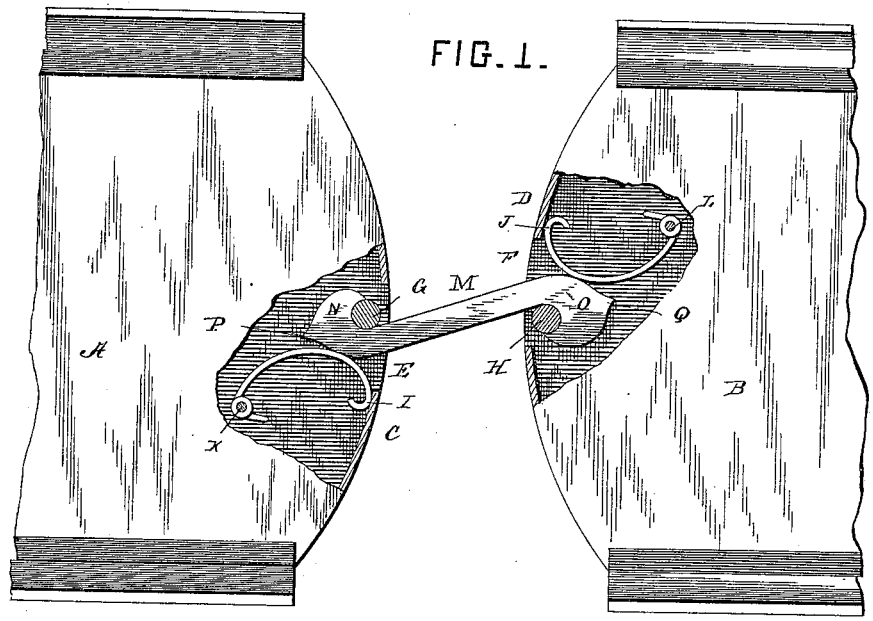
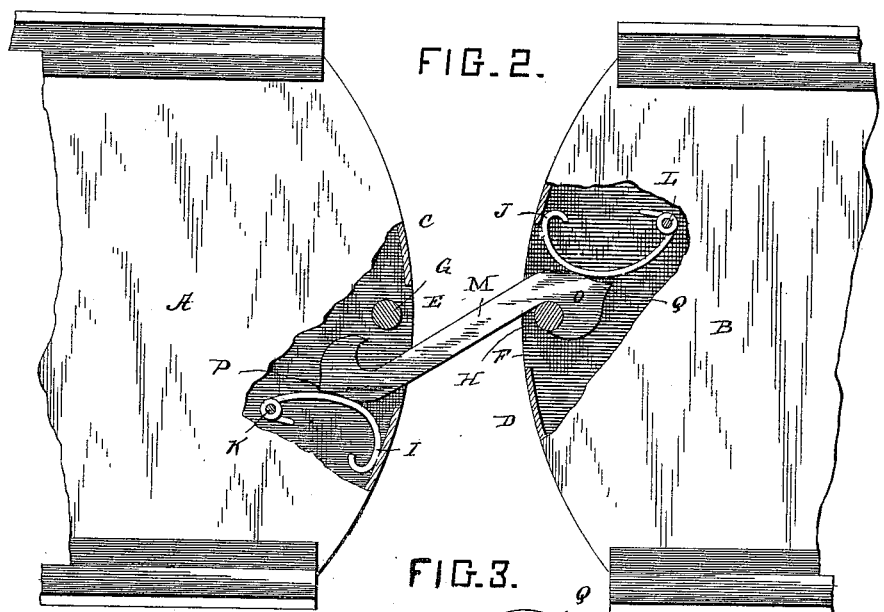
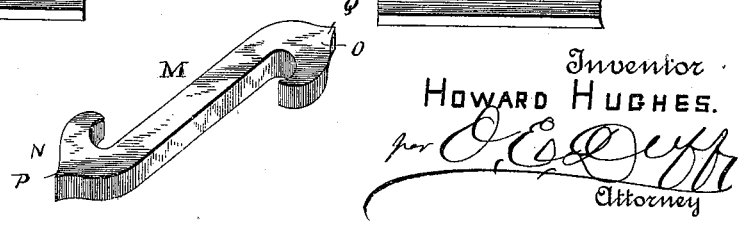
Witnesses
E. C. Duffy
F. C. Barry
Inventor
HOWARD HUGHES.
per O. E. Duffy
Attorney

UNITED STATES PATENT OFFICE.

HOWARD HUGHES, OF BRAZIL, INDIANA.

CAR-COUPLING FOR MINES.

SPECIFICATION forming part of Letters Patent No. 643,504, dated February 13, 1900.

Application filed April 5, 1899. Serial No. 711,804. (No model.)

*To all whom it may concern:*

Be it known that I, HOWARD HUGHES, of Brazil, in the county of Clay and State of Indiana, have invented certain new and useful Improvements in Car-Couplings for Mines; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to car-couplings especially adapted to mine-cars, although capable of use on other styles of cars, the object of the invention being to provide a coupling which shall be cheap to construct, simple in form, easy to release, and automatic in coupling.

With this object in view my invention consists in the improved construction, arrangement, and combination of the parts of a car-coupling, as fully described hereinafter, the points of novelty being specifically pointed out in the appended claim.

In the accompanying drawings, Figure 1 is a top plan view of the adjacent ends of two mine-cars coupled together by a coupling constructed in accordance with my invention, parts being broken away to show the interior construction. Fig. 2 is a similar view of the same parts in position to permit the cars to be moved apart. Fig. 3 is a detail perspective of the coupling-link.

Like letters of reference mark the same parts in all the figures of the drawings.

Referring to the drawings by letters, A and B indicate two mine-cars the bumpers of which are made hollow, their adjacent ends being convexly or outwardly curved, as shown at C and D, to permit of their turning on the sharp curves of the mine-tramways. These curved ends are provided with openings to admit of the passage of the ends of the coupling-link to the interior of the bumper, said openings being marked E and F. At the right-hand side of each opening, looking toward the outer end of the car, is a vertical pin, as at G and H, and at the opposite side of the openings substantially semicircular curved springs I J are mounted, being secured in the bumpers at the inner ends of the springs by pins K L and having their outer curved ends at the edge of the openings opposite to pins G and H, the central widely-curved bodies of the springs projecting partly across the openings toward but inside of the lines of the said pins.

M indicates the coupling-link, (shown in perspective, detached, in Fig. 3,) consisting of the main body and the oppositely-turned hook ends N and O, the extreme ends being formed with wedge-shaped cam projections P Q outside of the curve of the arcs upon which the outer sides of the hooks are drawn, the sides of the cam projections being curved on substantially the same radius as the springs I and J.

In coupling cars equipped with bumpers constructed in accordance with my invention it is only necessary to start the ends P and Q of the link into the openings of two adjacent bumpers, with the hooks turned toward the pins G and H, when by bringing the cars together they will be automatically connected, the cam ends of the link acting as wedges to push back the springs until the points of the hooks are inside of pins G and H, when the springs will force the hooks into the positions illustrated in Fig. 1, in which positions they will remain until released in the manner hereinafter described.

It will be understood by those skilled in the art that mine-cars are not usually propelled by motors, and to uncouple two cars they are pushed toward each other far enough to push the hook-points of the link slightly inside of the pins. The link, which is long enough on account of the necessity of turning sharp curves, as before stated, to permit of considerable space between the cars when on straight track, is now pressed sidewise near one end, bringing the hooks into the position shown in Fig. 2, when the cars may be pushed apart. To remove the link from the bumper in which it now remains, it is only necessary to press the free end farther in the same direction, making a lever, with the pin H as a fulcrum, until the wedge-shaped cam end Q presses the spring J back until said cam end slips past the curve of the spring and leaves the hook end O free to be taken out of the opening F.

The construction of the bumper ends in convex or outwardly-curved form permits the cars to be pushed around the very short curves used in mines without the bumpers coming in contact with each other at the inner sides of the curve and forming a fulcrum, with the cars as levers, to strain the structure and perhaps break the hook or pins or throw the car off the track. There is no chance for the hook to become a lever, with a fulcrum at the edge of the opening, whereby the cars would be uncoupled in turning a short curve, as is done in a well-known patented construction. In this instance the openings are at the extreme outsides of the convex ends, so that two adjacent cars can be turned at almost a right angle to each other without endangering the coupling. In turning such curves the natural tendency is for the hook pointing toward the inside of the curve to become disengaged from its pin; but this is prevented by the contact of the semicircular spring with the curved sides of the cam projections of the hook, thereby avoiding all danger from this source.

From the foregoing it will be seen that I have provided a simple, cheap, durable, and easily-operated coupling, especially for mine-cars, in which there is no loose pin to be lost or to hang down in the way and catch on every obstacle and in which nothing depends below the bumpers to interfere with the grip-rail usually used in mine-tramways and generally reaching upward to within a few inches of the bumper.

While I have illustrated simple and efficient means for carrying out my invention, I do not wish to be understood as restricting myself to the exact forms and constructions shown, but hold that any slight variation therefrom such as might suggest itself to the ordinary mechanic will clearly fall within the limit and scope of my invention.

Having thus fully described my invention, what I claim as new, and desire to secure by Letters Patent of the United States, is—

The combination with the hollow bumper of the mine-car provided with curved outer end having a central opening therein at the extreme outer part of the curve, of a fixed coupling-pin inside the bumper and close to one side of the opening, a substantially-semicircular curved spring secured only at its inner end inside the bumper, the main curved body of the spring projecting across the opening, and the backwardly-curved outer end normally resting at the edge of the opening opposite to the fixed pin, and a link consisting of the main body, the oppositely-turned hooks to engage the pins, and the wedge-shaped cam ends, with sides curved on substantially the curvature of the spring, substantially as described.

In testimony that I claim the foregoing as my own I affix my signature in presence of two witnesses.

HOWARD HUGHES.

Witnesses:
 ELZA AX,
 HENRY Z. KOPPIS.